United States Patent [19]
Araki et al.

[11] Patent Number: 6,147,166
[45] Date of Patent: Nov. 14, 2000

[54] RUBBER COMPOSITION USING A SILANE COUPLING AGENT HAVING A SPECIFIC DISTRIBUTION OF SULFUR

[75] Inventors: Shunji Araki; Kazuhiro Yanagisawa; Shinichi Motofusa, all of Tokyo, Japan

[73] Assignee: Bridgestone Corporation, Tokyo, Japan

[21] Appl. No.: 08/934,397

[22] Filed: Sep. 19, 1997

[30] Foreign Application Priority Data

Nov. 29, 1996 [JP] Japan ..................................... 8-319399

[51] Int. Cl.$^7$ .................................................. C08C 19/24
[52] U.S. Cl. ...................... 525/332.5; 524/571; 525/340
[58] Field of Search ............................................ 525/332.5

[56] References Cited

U.S. PATENT DOCUMENTS

| 2,376,264 | 5/1945 | Martin | 525/340 |
|---|---|---|---|
| 3,951,927 | 4/1976 | Aloia | 525/535 |

FOREIGN PATENT DOCUMENTS

| 51-20208 | 6/1976 | Japan | C08L 7/00 |
|---|---|---|---|
| 3-252431 | 11/1991 | Japan | C08L 9/00 |

*Primary Examiner*—Christopher Henderson
*Attorney, Agent, or Firm*—Sughrue, Mion, Zinn, Macpeak & Seas, PLLC

[57] ABSTRACT

The present invention provides a rubber composition and a pneumatic tire using the rubber composition. A rubber composition comprises silica in an amount of 10 to 85 parts by weight per 100 parts by weight of natural rubber and/or diene synthetic rubbers. A polysulfide silane coupling agent having a specific distribution of sulfur reacts with a trivalent phosphorus compound such that a content of high polysulfide in the polysulfide silane coupling agent is reduced. The rubber composition further comprises 1 to 20% by weight, based on an amount of the silica, of the polysulfide silane coupling agent having a specific distribution of sulfur such that a content of high polysulfide component is small. The pneumatic tire has an excellent low heat buildup property.

24 Claims, 1 Drawing Sheet

F I G. 1
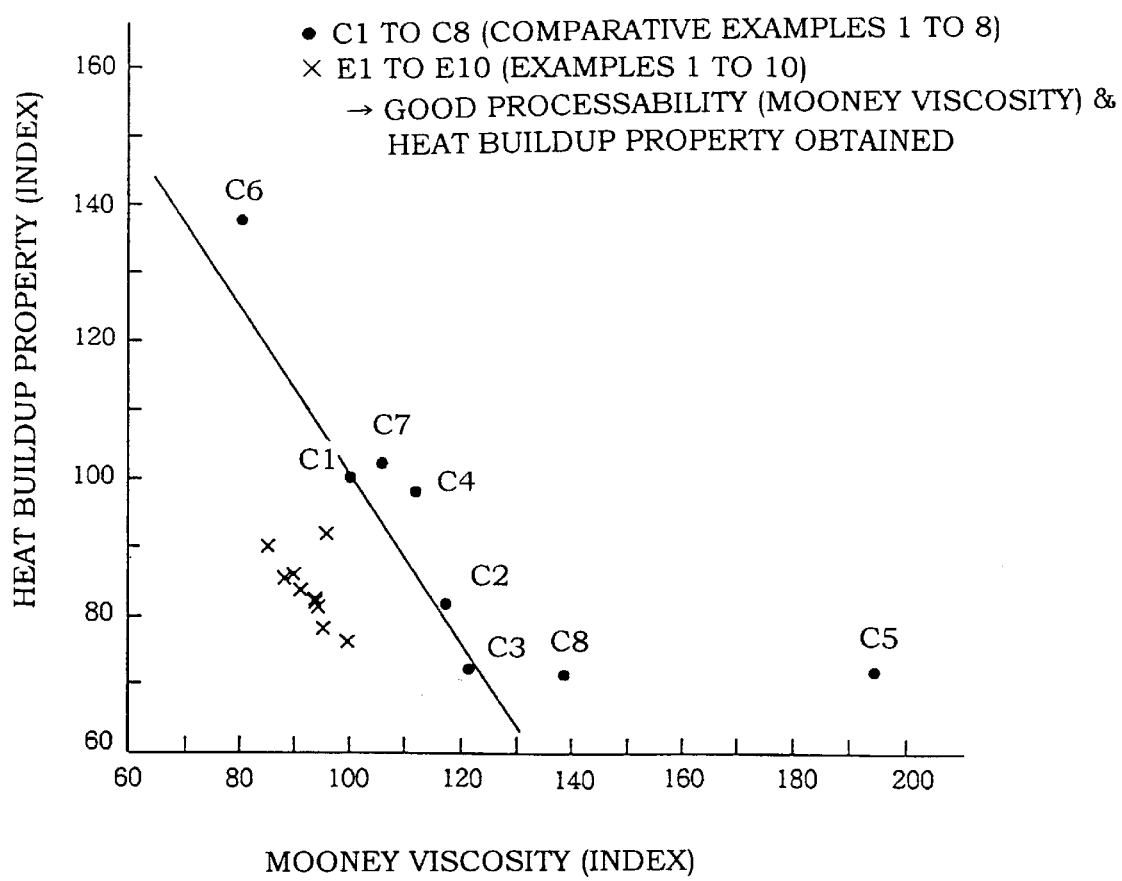

RUBBER COMPOSITION USING A SILANE COUPLING AGENT HAVING A SPECIFIC DISTRIBUTION OF SULFUR

BACKGROUND OF THE INVENTION

1. Field of the Invention

The present invention relates to a rubber composition comprising silica and a silane coupling agent and to a pneumatic tire prepared by using the rubber composition, and more particularly, to a rubber composition in which cross-linking reaction (i.e., gelation) of a polymer due to a silane coupling agent during mixing at high temperature of 150° C. or more is suppressed such that the reaction of silica and the silane coupling agent proceeds efficiently without a deterioration in workability.

2. Description of the Related Art

Heretofore, carbon black has been used as a reinforcing filler for rubber because carbon black provides higher reinforcement and more excellent abrasion resistance than other fillers. Recently, because of social requirements to save energy and to save resources, particularly to cut down fuel consumption of automobiles, a decrease in the heat buildup of rubber compositions is also required.

For decreasing the heat buildup of rubber compositions by using carbon black, use of a small amount of carbon black or carbon black having a large particle size is considered. It is, however, well known that, in both methods, decreasing heat buildup is in a contradictory relation with improving reinforcement and abrasion resistance of a rubber composition.

On the other hand, silica is known as a filler which provides decreased heat buildup of a rubber composition, and applications for many patents, for example, Japanese Patent Application Laid-Open No. Hei-3-252431, have heretofore been made.

However, silica particles tend to cohere together due to hydrogen bonding of silanol groups which are functional groups on the surfaces of the silica particles. For improving the dispersion of silica particles into rubber, the mixing time must be increased. When dispersion of silica particles into rubber is insufficient, a problem arises in that processability in processes such as extrusion and the like deteriorates due to the increase in the Mooney viscosity.

Moreover, the surfaces of the silica particles are acidic. Therefore, there are problems in that basic substances used as vulcanization accelerators are absorbed such that vulcanization is not carried out sufficiently, and a sufficient modulus of elasticity is not obtained.

In order to solve these problems, various types of silane coupling agents have been developed. For example, use of a silica-silane coupling agent as a reinforcing material is disclosed, for example, in Japanese Patent Application Publication No. Sho-51-20208. As the silane coupling agent, Si69 (trade name), which is manufactured by DEGUSSA AG., a German company and has a structure expressed by the following formula, is widely used:

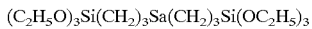

wherein a represents a positive number of 1 to 9. Here, the silane coupling agent is a mixture in which a is a number of 1 to 9, in which the average number of sulfur atoms is normally about 4, and which contains a relatively large amount of high polysulfide silane in which a is a number of 5 or more.

However, when the mixing temperature of rubber is low, the sufficient reinforcing effect is not obtained by this type of silane coupling agent. Moreover, the silane coupling agent is hydrolyzed, and the generated ethanol does not vaporize sufficiently and vaporizes during extrusion. Thus, there is a drawback in that blisters are formed. On the other hand, when mixing is conducted at high temperatures of 150° C. or more, the reinforcing property is improved. However, as a drawback, gelation of the polymer caused by the silane coupling agent takes place during mixing, and the Mooney viscosity increases. Thus, there is a drawback in that processing in later stages becomes difficult.

Therefore, as a result of studies conducted by the present inventors on a silane coupling agent which is suitable for mixing at a high temperature, it was found that, in order to prevent gelation of the polymer, it is necessary to reduce the content of high polysulfide silane such as pentasulfide silane, heptasulfide silane, hexasulfide silane, and the like, in the polysulfide silane.

However, when the content of sulfur in the polysulfide silane is changed, simply in accordance with the following reaction formula (A):

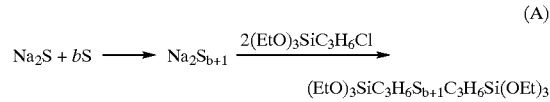

(wherein, Et represents an ethyl group), the entire distribution of number of sulfur is shifted and the content of disulfide silane which has a poor coupling effect is increased. Accordingly, a method of selectively removing high polysulfide silane is required.

SUMMARY OF THE INVENTION

The present invention answered the above request, and objects thereof are to provide a rubber composition and a pneumatic tire using the rubber composition in which high polysulfide silane such as pentasulfide silane, heptasulfide silane, hexasulfide silane, and the like is reliably and selectively removed, and as a polysulfide silane coupling agent obtained in this way is mixed with a silica compounded rubber, the cross-linking reaction of a polymer at high temperatures of 150° C. or more is suppressed, the gelation of the polymer hardly occurs, and a good coupling effect is obtained.

As a result of assiduous studies for achieving the above objects, the present inventors have found the following results. Namely, a trivalent phosphorus compound such as a phosphine and a phosphite is added to the polysulfide silane mixture which is represented by following general formula (1) in which 1 to 9 sulfur atoms are included and the average number of sulfur atoms is more than 2. The phosphorus compound reacts selectively with high polysulfide silane, and a portion of the sulfur is desulfurized from the polysulfide silane. Accordingly, a polysulfide silane mixture which is represented by the following general formula (2) and in which the content of high sulfide silane such as pentasulfide silane, heptasulfide silane, and hexasulfide silane is reduced is obtained. The polysulfide silane mixture obtained as described above can be used suitably for a silica compounded rubber as a silane coupling agent, and in particular, the cross-linking reaction of a polymer due to a silane coupling agent can be suppressed during mixing at high temperatures of 150° C. or more. The present invention has been completed on the basis of the above description.

A description of the present invention will be given as follows:

(1) A rubber composition which comprises a rubber component comprising at least one member selected from the group consisting of natural rubber and diene base synthetic rubbers; silica in an amount of 10 to 85 parts by weight per 100 parts by weight of the rubber component; and in an amount of 1 to 20% by weight of the amount of the silica, a polysulfide silane coupling agent represented by the following general formula (2) which is obtained by reaction of a polysulfide silane coupling agent represented by the following general formula (1) with a trivalent phosphorus compound such that the content of high polysulfide in the polysulfide silane coupling agent represented by the general formula (1) is reduced and the content of high polysulfide in the polysulfide silane coupling agent by the general formula (2) is less than the content of high polysulfide in the polysulfide silane coupling agent represented by the general formula (1):

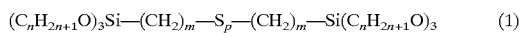

(wherein n represents an integer of 1 to 3, m represents an integer of 1 to 9, p represents an average number of sulfur atoms and a positive number of more than 2);

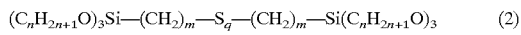

(wherein, n, m are the same as above, q represents an average number of sulfur atoms and a positive number of less than p).

(2) A rubber composition according to (1), further comprising 80 parts by weight or less of carbon black as a reinforcing filler per 100 parts by weight of the rubber component.

(3) A rubber composition according to (1), wherein the trivalent phosphorus compound is at least one member selected from the group consisting of phosphine compounds and phosphite compounds.

(4) A rubber composition according to (1), wherein the content of a disulfide silane in the polysulfide silane coupling agent represented by the general formula (2) is less than 80%, preferably 60% or less, based on the entire polysulfide silane, and the content of a high polysulfide silane, which has as many as or more sulfur atoms than pentasulfide silane, is 30% or less, preferably 25% or less, based on the entire polysulfide silane.

(5) A rubber composition according to (1), wherein the average number q of sulfur atoms in the polysulfide silane coupling agent represented by the general formula (2) is a positive number of 2.5 to 3.

(6) A pneumatic tire which is manufactured by using the rubber composition described in any one of (1), (2), (4) and (5) for tread rubber.

BRIEF DESCRIPTION OF THE DRAWING

FIG. 1 is a graph which shows the relationship between Mooney viscosity (index) and heat buildup property (index) in Examples 1 to 10 and Comparative Examples 1 to 8.

DESCRIPTION OF THE PREFERRED EMBODIMENTS

Embodiments for implementing the present invention are described in detail hereinafter.

As the rubber component in the present invention, natural rubber (NR) and synthetic rubbers can be used singly or as a blend of two or more rubbers. Examples of the synthetic rubber include synthetic polyisoprene rubber (IR), polybutadiene rubber (BR), styrene-butadiene rubber (SBR), and the like.

The silica used in the present invention is preferably, for example, synthetic hydrated silica. However, the silica used in the present invention is not limited to this.

The amount of silica used is 10 to 85 parts by weight, preferably 20 to 65 parts by weight, per 100 parts by weight of the above rubber component. When the amount of silica used is less than 10 parts by weight, the reinforcing property deteriorates. On the other hand, when the amount of silica used exceeds 85 parts by weight, workability such as workability in warming up and extrusion, deteriorates. Therefore, such amounts are not preferable. From the standpoint of the low heat buildup property and workability, the amount of silica used is preferably 20 to 65 parts by weight.

Next, the silane coupling agent used in the present invention is described concretely.

In the present invention, polysulfide silane mixture to be desulfurized is represented by the following general formula (1):

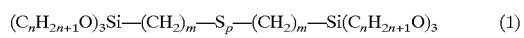

wherein n represents an integer of 1 to 3, m represents an integer of 1 to 9. Further, p represents an average number of sulfur atoms and a positive number of more than 2, and preferably, p represents a positive number of 2.2 to 9.

The mixture comprises a sulfide silane in which the number of sulfur atoms is 1 to 9, preferably 2 to 8. For example, a mixture which is obtained by properly selecting the amount of sulfur equal to the above-described value of p in accordance with the method similar to the above reaction formula (A) can be used as the polysulfide silane mixture.

As a trivalent phosphorus compound which is used to react with the above-described polysulfide silane, a phosphine compound such as $P(NR^1R^2)_3$ or $P(R^3)_3$, and a phosphite compound such as $P(OR^4)_3$ or a compound represented by the following formula (3) can be used.

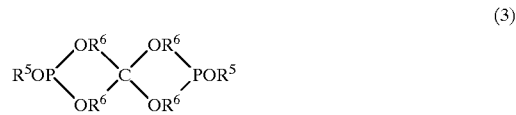

wherein $R^1$ to $R^5$ each independently represents a hydrogen atom or a substituted or unsubstituted monovalent hydrocarbon group such as an alkyl group, an alkenyl group, an aryl group, and an aralkyl group having preferably 1 to 20 carbon atoms. Further, as a substituted monovalent hydrocarbon group, for example, a halogen substituted hydrocarbon group can be used.

Among these, a $P(R^3)_3$ type in which $R_3$ is not a hydrogen atom is preferably used as a phosphine compound.

An example of a preferable phosphine compound is shown as follows:

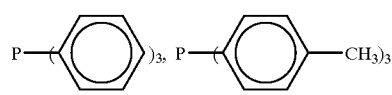

An example of a preferable phosphine compound is shown as follows:

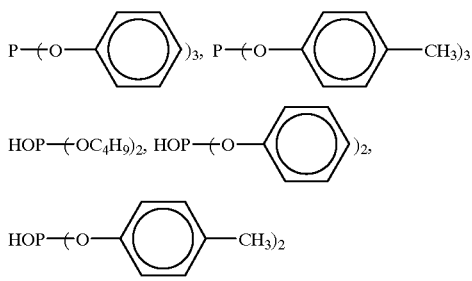

Further, a diphosphite compound described below is also preferably used.

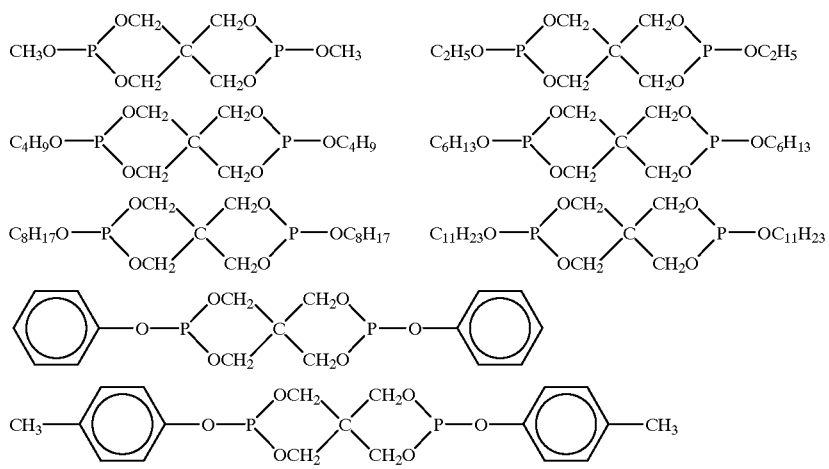

The reaction of the above-described polysulfide silane mixture with a trivalent phosphorus compound is usually carried out at −10° C. to 80° C., preferably 20° C. to 60° C.

Because the reaction is usually an exothermic reaction, the reaction can be performed by adding dropwise a trivalent phosphorus compound into the polysulfide silane. When the reaction temperature is 50 to 60° C., it suffices if the reaction time is within 8 hours. A solvent may be used. If the solvent is used, however, it can be a general solvent such as an alcohol solvent (e.g., ethanol), a hydrocarbon solvent (aromatic or aliphatic), an ester solvent, an ether solvent, a ketone solvent, and a chlorine-containing solvent. A sulfur containing phosphorus compound generated by desulfurization can be removed from the polysulfide silane mixture through removal by distillation under reduced pressure, filtration or the like. In a case in which the resultant polysulfide silane mixture is used as a silane coupling agent for a silica compounded rubber, particularly, in a case in which the mixture is used for an automobile tire or the like, since the sulfur containing phosphorus compound does not influence the physical properties of a tire, the compound may be remained in the polysulfide silane mixture and used as it is.

A reaction mol ratio between the polysulfide silane mixture and the trivalent phosphorus compound can be optimally selected in accordance with the average number of polysulfide (the value of p) in the polysulfide silane mixture. In a case in which the average number of sulfur atoms of the polysulfide portion is 2 to 4, it suffices if the reaction mol of the trivalent phosphorus compound per 1 mol of the polysulfide silane mixture is 2 mol or less. For example, in a case of a tetrasulfide silane in which P in formula (1) is 4, it is preferable that the trivalent phosphorus compound used is 0.5 to 2 mol per 1 mol of the tetrasulfide silane.

Namely, when 1 mol of $(C_2H_5O)_3SiC_3H_6SpC_3H_6Si(OC_2H_5)_3$ (wherein p=4 in the general formula (1)) reacts with 0.5 mol of phosphine or phosphite, the average number q of sulfur atoms in the general formula (2) of the polysulfide portion of an obtained polysulfide silane is about 3.5. In this case, high temperature mixing property of a tire rubber, in which the polysulfide silane is compounded, is fairly good and low fuel consumption property is extremely good. In a case in which 1 mol of the above-described polysulfide silane reacts with 1 to 1.5 mol of the phosphine or phosphite, p=4 in the polysulfide portion of the silane results in q=2.5 to 3. In this case, high temperature mixing property and low fuel consumption property are well-balanced. Moreover, when 1 mol of the polysulfide silane reacts with 2 mol of the phosphine or phosphite, high temperature mixing of the tire rubber, in which the obtained silane is compounded, is extremely good and low fuel consumption property is fairly good.

Further, when 1 mol of the polysulfide silane mixture having the polysulfide portion wherein p is 2.5 to 3 reacts with 0.5 mol or less of the trivalent phosphorus compound, a high polysulfide silane having as many as or more sulfur atoms than pentasulfide silane can be removed.

The desulfurization reaction through a phosphine compound and a phosphite compound proceeds as follows:

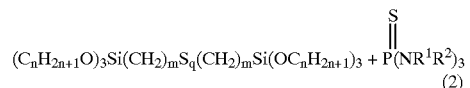

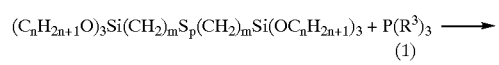

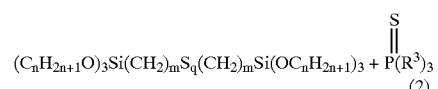

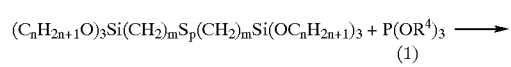

-continued

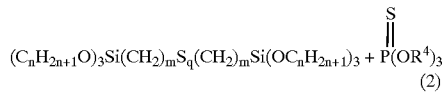
(2)

Further, the following reaction proceeds simultaneously, however, the reaction is not a main reaction.

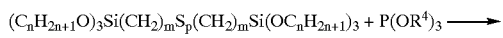

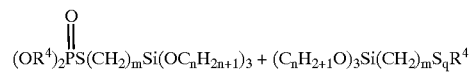

wherein n, m, p represent the same as described above, q represents the average number of sulfur atoms and a positive number of less than p.

In the polysulfide silane mixture represented by the above formula (2) obtained as mentioned above, the polysulfide silane mixture in which the content of disulfide silane is 80% or less, preferably 60% or less, based on the entire polysulfide silane, the content of high polysulfide silane which has as many as or more sulfur atoms than pentasulfide silane is 30% or less, preferably 25% or less, based on the entire polysulfide silane, and the polysulfide silane mixture, in which the content of trisulfide silane and tetrasulfide silane is large, is preferably used as a silane coupling agent. In the present invention, the polysulfide silane mixture described as above can be preferably used.

The amount of silane coupling agent is 1 to 20% by weight, preferably 3 to 15% by weight, based on the weight of silica. When the amount of silane coupling agent is less than 1% by weight, the coupling effect is small. On the other hand, when the amount of silane coupling agent exceeds 20% by weight, gelation of the polymer takes place. Therefore, such amounts are not preferable.

As the carbon black used as a reinforcing filler in the present invention, a carbon black of the grade SAF, ISAF, or HAF is preferably used. However, the type of carbon black is not particularly limited.

The amount of carbon black is preferably 5 parts by weight or more and 80 parts by weight or less per 100 parts by weight of the above rubber component. When the amount of carbon black is 5 parts by weight or less, the performance is good, however, a black color does not come out well. On the other hand, when the amount of carbon black exceeds 80 parts by weight, the low heat buildup property deteriorates to a great extent. From the standpoint of the reinforcing property and the low heat buildup property, the amount is more preferably 25 to 60 parts by weight.

Into the rubber composition of the present invention, compounding ingredients generally used in the rubber industry such as softeners, antioxidants, vulcanizing agents, vulcanization accelerators, and vulcanization accelerator activators, can suitably mixed as needed in addition to the rubber component, silica, the silane coupling agent, and the carbon black serving as a reinforcing filler.

To effectively exhibit the characteristics of the rubber composition of the present invention, the mixing temperature is preferably 150° C. or higher and 185° C. or lower. When the mixing temperature is lower than 150° C., the silane coupling agent does not react sufficiently with the silica, and blisters are formed during extrusion. On the other hand, when the temperature exceeds 185° C., gelation of the polymer takes place such that the Mooney viscosity increases. Therefore, such temperatures are not preferable from the standpoint of processing.

EXAMPLES

The present invention is described specifically with reference to following Examples and Comparative Examples. However, the present invention is not limited to the following Examples.

Firstly, a method of measuring a polysulfide distribution of various types of polysulfide silane prepared in accordance with following Preparing Examples 1 to 8 will be explained.

Various types of silane coupling agents are expressed by the following formula:

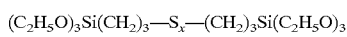

and $—S_x—$ in this formula has the distribution shown in Table 1. The distributions of various sulfur chain components ($—S_x—$) shown in Table 1 were obtained by calculation from peak areas (%) obtained by high performance liquid chromatography (HPLC). The analysis by HPLC is described in detail hereinafter.

(Conditions of analysis by HPLC)

HPLC: manufactured by TOSOH CORPORATION, HLC-8020

UV detector: manufactured by TOSOH CORPORATION, UV-8010 (254 nm)

Recorder: manufactured by TOSOH CORPORATION, SUPER SYSTEM CONTROLLER SC-8010

Column: manufactured by TOSOH CORPORATION, TSKgel ODS-80T$_M$CTR (inner diameter: 4.6 mm, length: 10 cm)

Temperature at the time of measurement: 25° C.

Concentration of sample: 6 mg/10 cc (6 mg per 10 cc of) acetonitrile solution

Amount of sample injected: 20 $\mu$l

Condition of elusion: flow rate of 1 cc/min

A sample was eluted for 2 minutes with a mixed solution of acetonitrile and water having a fixed composition of 1:1, and then with a mixed solution having a varying composition with such a gradient that the solution contained 100% of acetonitrile after 18 minutes.

Preparing Example 1

506 g (1.0 mol) of silane (A), which has the polysulfide distribution shown in the following Table 1 and which has an average of three sulfur atoms per polysulfide chain, was weighed and charged into a 1-liter flask. 49.9 g (0.3 mol) of triethyl phosphite was added dropwise into the flask through a dropping funnel over 2 hours while stirring the solution within the flask. During this time, the temperature within the flask rose from 25° C. to 50° C. The stirring was conducted for another 3 hours and the solution was checked through gas chromatography. It was found that a peak assigned to triethyl phosphite was diminished and that the reaction took place. Table 1 shows the results of measurement of polysulfide distributions in obtained composition (I) through liquid chromatography. It shows that high polysulfide portions selectively reacted with the phosphite.

Preparing Example 2

Instead of the triethyl phosphite of Preparing Example 1, 67.8 g (0.15 mol) of compound represented by the following formula was used:

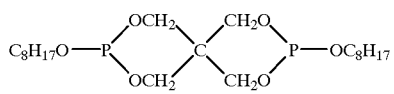

A reaction was carried out in the same way as Preparing Example 1 and composition (II) was obtained.

Preparing Example 3

Instead of the triethyl phosphite of Preparing Example 1, 78.7 g (0.3 mol) of triphenyl phosphine was used. A reaction was carried out in the same way as Preparing Example 1 and composition (III) was obtained.

Preparing Example 4

Instead of average trisulfide silane (A) of Preparing Example 1, 490 g (1 mol) of polysulfide silane (B) having an average value of 2.5 was used. Except for the silane, a reaction was carried out in the same way as Preparing Example 1 and composition (IV) was obtained.

Preparing Example 5

538 g (1 mol) of an average tetrasulfide silane (C) (Si69, manufactured by DEGUSSA AG., a German company) which has a polysulfide distribution shown in the following Table 1 was weighed and charged into a 1-liter flask. 83.1 g (0.5 mol) of triethyl phosphite was added dropwise into the flask through a dropping funnel over 2 hours while stirring the solution within the flask. During this time, the temperature within the flask rose from 25° C. to 50° C. The stirring was conducted for another 3 hours and the solution was checked through gas chromatography. It was found that a peak assigned to triethyl phosphite was diminished and that the reaction took place. Table 1 shows the results of measurement of polysulfide distributions in obtained composition (V) through liquid chromatography. It shows that high polysulfide portions selectively reacted with the phosphite.

Preparing Example 6

In Preparing Example 5, 166.2 g (1 mol) of triethyl phosphite was used and added dropwise over 2 hours. During this time, a flask was cooled by water in order to maintain the temperature therewithin at 50° C. or lower. Next, the solution within the flask was heated and stirred for 3 hours at 40 to 50° C., and thereafter, composition (VI) was obtained in the same way as Preparing Example 5.

Preparing Example 7

Instead of triethyl phosphite of Preparing Example 6, 226 g (0.5 mol) of a compound represented by the following formula was used:

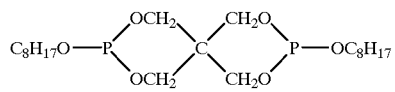

A reaction was carried out in the same way as Preparing Example 6 and composition (VII) was obtained.

Preparing Example 8

Instead of triethyl phosphite of Preparing Example 6, 262.3 g (1 mol) of triphenyl phosphine was used. A reaction was carried out Instead of triethyl phosphite of Preparing Example 6, 262.3 g (1 mol) of triphenyl phosphine was used. A reaction was carried out in the same way as Preparing Example 6 and composition (VIII) was obtained.

TABLE 1

| | | $-S_2-$ | $-S_3-$ | $-S_4-$ | $-S_5-$ | $-S_6-$ | $-S_7-$ | $-S_8-$ | Sum of $-S_5-$ or more |
|---|---|---|---|---|---|---|---|---|---|
| Types of Polysulfide Silane Coupling Agent % by weight) | Composition (A) | 6.3 | 31.2 | 27.8 | 20.4 | 10.4 | 3.9 | 0 | 34.7 |
| | Composition (I) | 7.7 | 48.9 | 25.7 | 15.6 | 2.1 | 0 | 0 | 17.7 |
| | Composition (II) | 8.6 | 46.5 | 26.3 | 15.8 | 3.4 | 0 | 0 | 19.2 |
| | Composition (III) | 8.1 | 59.0 | 18.7 | 14.2 | 0 | 0 | 0 | 14.2 |
| | Composition (B) | 17.4 | 42.1 | 25.9 | 10.7 | 3.9 | 0 | 0 | 14.6 |
| | Composition (IV) | 20.5 | 56.4 | 20.6 | 2.5 | 0 | 0 | 0 | 2.5 |
| | Composition (C) | 2.6 | 16.0 | 23.7 | 24.8 | 18.6 | 10.4 | 3.9 | 57.7 |
| | Composition (V) | 5.0 | 29.9 | 43.1 | 16.9 | 5.1 | 0 | 0 | 22.0 |
| | Composition (VI) | 11.1 | 62.8 | 26.1 | 0 | 0 | 0 | 0 | 0 |

TABLE 1-continued

| | $-S_2-$ | $-S_3-$ | $-S_4-$ | $-S_5-$ | $-S_6-$ | $-S_7-$ | $-S_8-$ | Sum of $-S_5-$ or more |
|---|---|---|---|---|---|---|---|---|
| Composition (VII) | 12.7 | 58.2 | 28.3 | 0.8 | 0 | 0 | 0 | 0.8 |
| Composition (VIII) | 8.3 | 64.1 | 27.6 | 0 | 0 | 0 | 0 | 0 |
| Composition (D)* | 97.3 | 2.7 | 0 | 0 | 0 | 0 | 0 | 0 |

*Synthesized in accordance with a method described in Japanese Patent Application Laid-Open No. Hei-8-259739.

By using various types of polysulfide silane prepared as mentioned above, various types of rubber compositions were prepared at a basic rate of formulation shown in the following Table 2 and by formulation shown in the following Tables 3 and 4.

Various types of rubber compositions obtained by the Examples and Comparative Examples were applied to the treads of 185/60R14 size pneumatic tires for a passenger car and various types of tires were manufactured.

The obtained rubber compositions were evaluated with respect to Mooney viscosity and hysteresis loss property (heat buildup property) by the following methods of evaluation. Further, the manufactured tires were evaluated with respect to rolling resistance in accordance with the following method.

(1) Mooney viscosity

Mooney viscosity was measured in accordance with the method of Japanese Industrial Standard K6300 for a time of 4 minutes at a temperature of 130° C. after preheating for 1 minute. The obtained result is expressed as an index with reference to a control. The smaller the index, the lower the Mooney viscosity and the better the processability.

(2) Measurement of the hysteresis loss property (heat buildup)

The internal loss (tan δ) was measured by using a viscoelastic spectrometer manufactured by IWAMOTO SEISAKUSHO Co., Ltd. under the conditions of a dynamic tensile strain of 1%, a frequency of 50 Hz, and a temperature of 60° C. A slab sheet having a thickness of about 2 mm and a width of 5 mm was used as a test piece. The distance between clamps was 2 cm, and the initial load was 160 g. The obtained value of tan δ is expressed as an index with reference to a control. The smaller the index, the smaller the hysteresis loss and the lower the heat buildup.

(3) Measurement of rolling resistance

The tire prepared as described above was attached to a rim 6JJ, inflated to an inner pressure of 2.0 kg/cm$^2$ and, under a load of 440 kg, was made to contact a drum having an outer diameter of 1.7 m, and the drum was rotated. The speed was increased to 120 km/hour, and then the drum was allowed to rotate inertially. The moment of inertia was measured when the speed reached 80 km/hour. Rolling resistance was evaluated from the obtained moment of inertia in accordance with the following equation:

index=[(moment of inertia of control tire)/(moment of inertia of sample tire)]×100

The calculated value is expressed as an index with the value of a control being set to 100. The larger the index, the better the rolling resistance.

In the above evaluations of (1), (2) and (3), the rubber composition of Comparative Example 1 was used as the control for Examples 1 to 10 and Comparative Examples 1 to 8, the rubber composition of Comparative Example 9 was used as the control for Example 11 and Comparative Examples 9 and 10, and the rubber composition of Comparative Example 11 was used as the control for Examples 12 and 13 and Comparative Example 11.

TABLE 2

| components of formulation | parts by weight |
|---|---|
| rubber component | 100 |
| silica | varied |
| carbon black | varied |
| aromatic oil | 20 |
| stearic acid | 2 |
| silane coupling agent | varied |
| zinc oxide | 3 |
| antioxidant*[1] | 1 |
| vulcanization accelerator*[2] | 1.5 |
| sulfur | 1.5 |

*[1] N-phenyl-N'-isopropyl-p-phenylenediamine
*[2] N-oxydiethylene-2-benzothiazolsulfenamide

TABLE 3

| Example | | | | | | | 1 | 2 | 3 | 4 | 5 | 6 |
|---|---|---|---|---|---|---|---|---|---|---|---|---|
| Comparative Example | 1 | 2 | 3 | 4 | 5 | 6 | | | | | | |
| Formulation (parts by weight) | | | | | | | | | | | | |
| BR01*[1] | — | — | — | — | — | — | — | — | — | — | — | — |
| SBR1500*[1] | 60 | 60 | 60 | 60 | 60 | 60 | 60 | 60 | 60 | 60 | 60 | 66 |
| NR | 40 | 40 | 40 | 40 | 40 | 40 | 40 | 40 | 40 | 40 | 40 | 40 |

TABLE 3-continued

| | | | | | | | | | | | | |
|---|---|---|---|---|---|---|---|---|---|---|---|---|
| silica (NIPSIL AQ)*2 | 50 | 50 | 50 | 50 | 50 | 50 | 50 | 50 | 50 | 50 | 50 | 50 |
| carbon black (SEAST 3H)*3 | — | — | — | — | — | — | — | — | — | — | — | — |
| silane coupling agent | | | | | | | | | | | | |
| type | A | A | A | B | C | D | I | II | III | IV | V | VI |
| amount | 5.0 | 5.0 | 5.0 | 5.0 | 5.0 | 5.0 | 5.0 | 5.0 | 5.0 | 5.0 | 5.0 | 5.0 |
| measured temperature of mixed rubber (° C.) | 143 | 154 | 165 | 155 | 156 | 154 | 164 | 163 | 164 | 162 | 165 | 164 |
| Results of evaluation | | | | | | | | | | | | |
| Mooney viscosity (index) | 100 | 116 | 121 | 112 | 194 | 80 | 89 | 91 | 90 | 85 | 95 | 93 |
| heat buildup (index) | 100 | 82 | 73 | 98 | 72 | 137 | 86 | 84 | 86 | 90 | 78 | 82 |
| rolling resistance (index) | 100 | 110 | 114 | 102 | 114 | 85 | 107 | 108 | 105 | 106 | 111 | 110 |

*1 Manufactured by JAPAN SYNTHETIC RUBBER Co., Ltd.
*2 Manufactured by NIPPON SILICA INDUSTRIAL Co., Ltd.
*3 Manufactured by TOKAI CARBON Co., Ltd.

TABLE 4

| | | | | | | | | | | | | |
|---|---|---|---|---|---|---|---|---|---|---|---|---|
| Example | 7 | 8 | 9 | | 10 | | | | 11 | | 12 | 13 |
| Comparative Example | | | | 7 | | 8 | 9 | 10 | | 11 | | |
| Formulation (parts by weight) | | | | | | | | | | | | |
| BR01*1 | — | — | — | — | — | — | — | — | — | — | — | — |
| SBR1500*1 | 60 | 60 | 60 | 60 | 60 | 60 | — | — | — | — | — | — |
| NR | 40 | 40 | 40 | 40 | 40 | 40 | 100 | 100 | 100 | 100 | 100 | 100 |
| silica (NIPSIL AQ)*2 | 50 | 50 | 70 | 90 | 50 | 50 | 10 | 10 | 10 | 30 | 30 | 20 |
| carbon black (SEAST 3H)*3 | — | — | — | — | — | — | 40 | 40 | 40 | 60 | 60 | 70 |
| silane coupling agent | | | | | | | | | | | | |
| type | VII | VIII | I | I | V | V | A | A | I | A | I | I |
| amount | 5.0 | 5.0 | 7.0 | 9.0 | 8.0 | 12.0 | 1.0 | 1.5 | 1.5 | 3.0 | 3.6 | 2.4 |
| measured temperature of mixed rubber (° C.) | 162 | 166 | 166 | 167 | 163 | 164 | 164 | 162 | 162 | — | — | — |
| Results of evaluation | | | | | | | | | | | | |
| Mooney viscosity (index) | 93 | 94 | 96 | 106 | 99 | 138 | 100 | 112 | 90 | 100 | 85 | 92 |
| heat buildup (index) | 83 | 81 | 92 | 102 | 76 | 72 | 100 | 94 | 95 | 100 | 94 | 98 |
| rolling resistance (index) | 109 | 110 | 95 | 98 | 112 | 114 | 100 | 102 | 102 | 100 | 104 | 101 |

*1 Manufactured by JAPAN SYNTHETIC RUBBER Co., Ltd.
*2 Manufactured by NIPPON SILICA INDUSTRIAL Co., Ltd.
*3 Manufactured by TOKAI CARBON Co., Ltd.

FIG. 1 is a graph which shows the relationship between the Mooney viscosity and the heat buildup property of the above-described Examples and Comparative Examples. As can be seen in FIG. 1, good processability (Mooney viscosity) and good heat buildup property were obtained in all Examples.

Because the rubber composition of the present invention uses a silane coupling agent having a specific distribution of sulfur, cross-linking reaction of a polymer due to the silane coupling agent during mixing at high temperatures of 150° C. or more is suppressed. The reaction of silica and the silane coupling agent can efficiently be conducted without a decrease in workability, and dispersion of the silica into the rubber is improved. Therefore, the rubber composition is widely used for various types of pneumatic tires having excellent low heat buildup property.

What is claimed is:

1. A rubber composition which comprises a rubber component comprising at least one member selected from the group consisting of natural rubber and diene based synthetic rubbers; silica in an amount of 10 to 85 parts by weight per 100 parts by weight of the rubber component; and, in an amount of 1 to 20% by weight of the amount of silica, a polysulfide silane coupling agent (B) represented by the following general formula (2) which is obtained by reaction of a polysulfide silane coupling agent (A) represented by the following general formula (1) with a trivalent phosphorus compound such that the content of high polysulfide in the polysulfide silane coupling agent (A) is reduced and the content of high polysulfide in the polysulfide silane coupling agent (B) is less than the content of high polysulfide in the polysulfide silane coupling agent (A), wherein the trivalent phosphorus compound is at least one compound selected from the group consisting of phosphine compounds represented by $P(NR^1R^2)_3$ or $P(R^3)_3$, phosphite compounds represented by $P(OR^4)_3$, and compounds represented by the following formula (3):

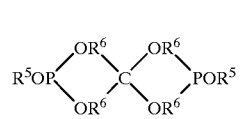

(3)

wherein $R^1$ to $R^5$ each independently represents a hydrogen atom or a substituted or unsubstituted monovalent hydrocarbon group;

general formula (1):

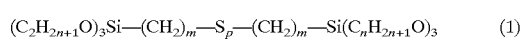

(1)

(wherein n represents an integer of 1 to 3, m represents an integer of 1 to 9, p represents an average number of sulfur atoms and a positive number of more than 2);

general formula (2):

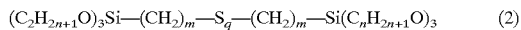 (2)

(wherein, n and m are the same as above, q represents an average number of sulfur atoms and a positive number of less than p).

2. A rubber composition according to claim 1, further comprising 80 parts by weight or less of carbon black as a reinforcing filler per 100 parts by weight of the rubber component.

3. A rubber composition according to claim 1, wherein the content of a disulfide silane in said polysulfide silane coupling agent (B) is less than 80% based on the entire polysulfide silane, and the content of a high polysulfide silane, which has as many as or more sulfur atoms than pentasulfide silane, is 30% or less based on the entire polysulfide silane.

4. A rubber composition according to claim 3, wherein the content of a disulfide silane in said polysulfide silane coupling agent (B) is 60% or less based on the entire polysulfide silane, and the content of a high polysulfide silane, which has as many as or more sulfur atoms than pentasulfide silane, is 25% or less based on the entire polysulfide silane.

5. A rubber composition according to claim 1, wherein the average number q of sulfur atoms in said polysulfide silane coupling agent (B) is from 2.5 to 3.

6. A rubber composition according to claim 1, wherein the polysulfide silane coupling agent (A) is a mixture of polysulfide silanes.

7. A rubber composition according to claim 1, wherein the polysulfide silane coupling agent (B) is a mixture of polysulfide silanes.

8. A rubber composition according to claim 7, wherein the mixture of polysulfide silanes comprises polysulfide silanes represented by the following general formula:

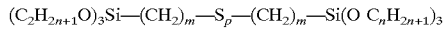

wherein n represents an integer of 1 to 3, m represents an integer of 1 to 9, and p represents the number of sulfur atoms and represents an integer of 1 to 9.

9. A rubber composition according to claim 8, wherein the mixture of polysulfide silanes comprises polysulfide silanes represented by the following general formula:

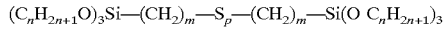

wherein n represents an integer of 1 to 3, m represents an integer of 1 to 9, and p represents the number of sulfur atoms and represents an integer of 2 to 8.

10. A rubber composition according to claim 1, wherein p in general formula 1 is from 2.2 to 9.

11. A rubber composition according to claim 1 which is obtained by mixing the rubber component, the silica and the polysulfide silane coupling agent (B) at a mixing temperature of 150° C. or greater.

12. A rubber composition according to claim 1 which is obtained by mixing the rubber component, the silica and the polysulfide silane coupling agent (B) at a mixing temperature of 150° C. to 185° C., both inclusive.

13. A rubber composition according to claim 1, wherein the trivalent phosphorus compound is a phosphine compound represented by $P(R^3)_3$ wherein $R^3$ is not a hydrogen atom.

14. A rubber composition according to claim 1, wherein the trivalent phosphorus compound is at least one compound selected from the group consisting of the following trivalent phosphorus compounds:

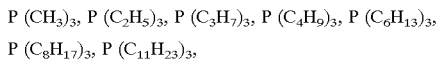

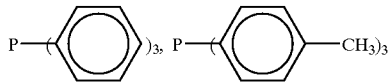

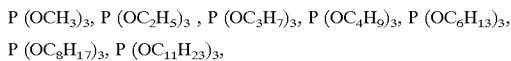

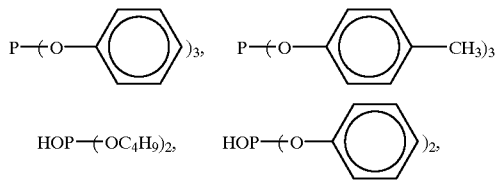

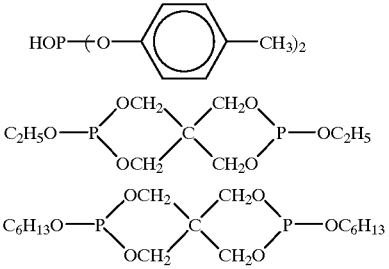

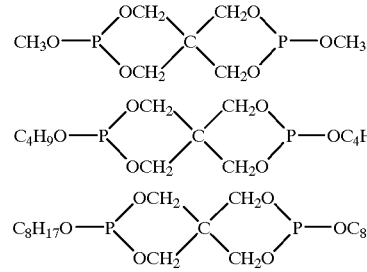

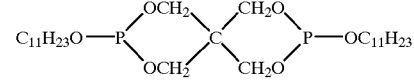

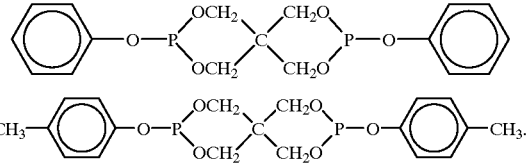

15. A rubber composition according to claim 1 further comprising a sulfur containing phosphorus compound which is generated by said reaction of the polysulfide coupling agent (A) and the trivalent phosphorus compound.

16. A rubber composition according to claim 1, which does not contain a sulfur containing phosphorus compound which is generated by said reaction of the polysulfide coupling agent (A) and the trivalent phosphorus compound.

17. A rubber composition according to claim 1, wherein p is 2 to 4 in general formula (1), and the reaction molar ratio of the trivalent phosphorus compound to the polysulfide silane coupling agent (A) is 2 or less.

18. A rubber composition according to claim 1, wherein the reaction is carried out at −10° C. to 80° C.

19. A rubber composition according to claim 1, wherein the reaction is carried at 20° C. to 60° C.

20. A rubber composition according to claim 1, wherein the reaction is a desulfurization reaction.

21. A rubber composition according to claim 1, wherein the value of n in general formula (1) is the same as the value of n in general formula (2), and the value of m in general formula (1) is the same as the value of m in general formula (2).

22. A rubber composition comprising:
(i) a rubber component comprising at least one member selected from the group consisting of natural rubber and diene based synthetic rubbers;
(ii) silica in an amount of 10 to 85 parts by weight per 100 parts by weight of the rubber component;
(iii) a polysulfide silane coupling agent (B) in an amount of 1 to 20% by weight of the amount of the silica;
wherein the polysulfide silane coupling agent (B) is obtained by a reaction of a polysulfide silane coupling agent (A) with at least one trivalent phosphorus compound selected from the group consisting of phosphine compounds represented by $P(NR^1R^2)_3$ or $P(R^3)_3$, phosphite compounds represented by $P(OR^4)_3$, and compounds represented by the following formula (3):

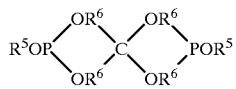

(3)

wherein $R^1$ to $R^5$ each independently represents a hydrogen atom or a substituted or unsubstituted monovalent hydrocarbon group;
the polysulfide silane coupling agent (A) is represented by the following general formula (1):

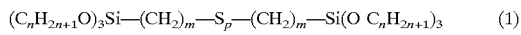

(1)

(wherein n represents an integer of 1 to 3; m represents an integer of 1 to 9; and p represents an average number of sulfur atoms; and the average number of p is a positive number of 2 or more);
the polysulfide silane coupling agent (B) is represented by the following general formula (2):

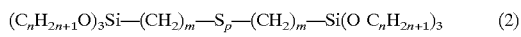

(2)

(wherein n represents an integer of 1 to 3; m represents an integer of 1 to 9; and q represents an average number of sulfur atoms and is a positive number);
the value of n in general formula (1) is the same as the value of n in general formula (2), and the value of m in general formula (1) is the same as the value of m in general formula (2);
the value of p is less than the value of q; and
the polysulfide silane coupling agent (A) and the polysulfide silane coupling agent (B) are each a mixture of polysulfide silanes.

23. A rubber composition comprising:
(i) a rubber component comprising at least one member selected from the group consisting of natural rubber and diene based synthetic rubbers;
(ii) silica in an amount of 10 to 85 parts by weight per 100 parts by weight of the rubber component;
(iii) a polysulfide silane coupling agent (B) in an amount of 1 to 20% by weight of the amount of the silica;
wherein the polysulfide silane coupling (B) agent is obtained by a reaction of a polysulfide silane coupling agent (A) with at least one trivalent phosphorus compound selected from the group consisting of phosphine compounds represented by $P(NR^1R^2)_3$ or $P(R^3)_3$, phosphite compounds represented by $P(OR^4)_3$, and compounds represented by the following formula (3):

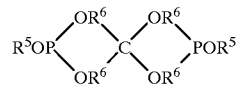

(3)

wherein $R^1$ to $R^5$ each independently represents a hydrogen atom or a substituted or unsubstituted monovalent hydrocarbon group;
the polysulfide silane coupling agent (A) is represented by the following general formula (1):

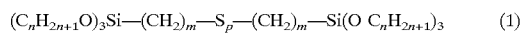

(1)

(wherein n represents an integer of 1 to 3; m represents an integer of 1 to 9; and p represents an average number of sulfur atoms and a positive number of 2 or more); and
the polysulfide silane coupling agent (B) is represented by the following general formula (1):

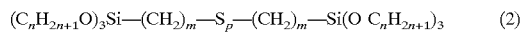

(2)

(wherein n represents an integer of 1 to 3; m represents an integer of 1 to 9; and q represents an average number of sulfur atoms and is a positive number);
the value of q is less than the value of p; and
the value of n in general formula (1) is the same as the value of n in general formula (2), and the value of m in general formula (1) is the same as the value of m in general formula (2).

24. A rubber composition comprising:
(i) a rubber component comprising at least one member selected from the group consisting of natural rubber and diene based synthetic rubbers;
(ii) silica in an amount of 10 to 85 parts by weight per 100 parts by weight of the rubber component; and
(iii) a polysulfide silane coupling agent (B) in an amount of 1 to 20% by weight of the amount of the silica;
wherein the polysulfide silane coupling agent (B) is obtained by a reaction of a polysulfide silane coupling agent (A) with at least one trivalent phosphorus compound selected from the group consisting of phosphine compounds represented by $P(NR^1R^2)_3$ or $P(R^3)_3$, phosphite compounds represented by $P(OR^4)_3$, and compounds represented by the following formula (3):

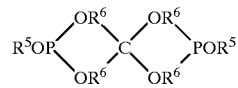

(3)

wherein $R^1$ to $R^5$ each independently represents a hydrogen atom or a substituted or unsubstituted monovalent hydrocarbon group, and the polysulfide silane coupling agent (A) is represented by the following general formula (1):

$$(C_nH_{2n+1}O)_3Si\text{—}(CH_2)_m\text{—}S_p\text{—}(CH_2)_m\text{—}Si(O\ C_nH_{2n+1})_3 \qquad (1)$$

(wherein n represents an integer of 1 to 3; m represents an integer of 1 to 9; and p represents an average number of sulfur atoms and integer of 2 or more).

* * * * *

UNITED STATES PATENT AND TRADEMARK OFFICE
CERTIFICATE OF CORRECTION

PATENT NO. : 6,147,166
DATED : November 14, 2000
INVENTOR(S) : Shunji Araki, Kazuhiro Yanagisawa and Shinichi Motofusa It is certified that error appears in the above-identified patent and that said Letters Patent is hereby corrected as shown below:

Column 14,
Line 67, (Formula (1)): "$(C_2H_{2n+1}O)_3Si-(CH_2)_m-S_p-(CH_2)_m-Si(C_nH_{2n+1}O)_3$" should read
-- $(C_nH_{2n+1}O)_3Si-(CH_2)_m-S_p-(CH_2)_m-Si(C_nH_{2n+1}O)_3$ --.

Column 15,
Line 6, (Formula (2)): "$(C_2H_{2n+1}O)_3Si-(CH_2)_m-S_q-(CH_2)_m-Si(C_nH_{2n+1}O)_3$" should read
-- $(C_nH_{2n+1}O)_3Si-(CH_2)_m-S_q-(CH_2)_m-Si(C_nH_{2n+1}O)_3$ --.
Line 40, "$(C_2H_{2n+1}O)_3Si-(CH_2)_m-S_p-(CH_2)_m-Si(C_nH_{2n+1}O)_3$" should read
-- $(C_nH_{2n+1}O)_3Si-(CH_2)_m-S_p-(CH_2)_m-Si(C_nH_{2n+1}O)_3$ --.

Column 17,
Line 51, "(Formula (2)): $(C_nH_{2n+1}O)_3Si-(CH_2)_m-S_p-(CH_2)_m-Si(C_nH_{2n+1}O)_3$" should read
-- $(C_nH_{2n+1}O)_3Si-(CH_2)_m-S_q-(CH_2)_m-Si(C_nH_{2n+1}O)_3$ --.
Line 60, "the value of p is less than the value of q; and" should read:
-- the value of q is less than the value of p; and".

Column 18,
Line 33, (Formula (2)): $(C_nH_{2n+1}O)_3Si-(CH_2)_m-S_p-(CH_2)_m-Si(C_nH_{2n+1}O)_3$" should read
-- $(C_nH_{2n+1}O)_3Si-(CH_2)_m-S_q-(CH_2)_m-Si(C_nH_{2n+1}O)_3$ --.

Signed and Sealed this

Seventeenth Day of December, 2002

JAMES E. ROGAN
*Director of the United States Patent and Trademark Office*

EX PARTE REEXAMINATION CERTIFICATE (4875th)
United States Patent
Araki et al.

(10) Number: US 6,147,166 C1
(45) Certificate Issued: Nov. 4, 2003

(54) RUBBER COMPOSITION USING A SILANE COUPLING AGENT HAVING A SPECIFIC DISTRIBUTION OF SULFUR

(75) Inventors: Shunji Araki, Tokyo (JP); Kazuhiro Yanagisawa, Tokyo (JP); Shinichi Motofusa, Tokyo (JP)

(73) Assignee: Bridgestone Corporation, Tokyo (JP)

Reexamination Request:
No. 90/006,371, Aug. 30, 2002

Reexamination Certificate for:
Patent No.: 6,147,166
Issued: Nov. 14, 2000
Appl. No.: 08/934,397
Filed: Sep. 19, 1997

Certificate of Correction issued Dec. 7, 2002.

(30) Foreign Application Priority Data

Nov. 29, 1996 (JP) .............................. 8-319399

(51) Int. Cl.$^7$ .............................................. C08C 19/24
(52) U.S. Cl. ..................... 525/332.5; 524/571; 525/340
(58) Field of Search ....................................... 525/332.5

(56) References Cited

U.S. PATENT DOCUMENTS

| | | |
|---|---|---|
| 3,978,103 A | 8/1976 | Meyer-Simon et al. ................... 260/448.8 R |
| 4,514,231 A | 4/1985 | Kerner et al. ............... 106/309 |
| 5,447,971 A | 9/1995 | Bergh et al. ................. 523/213 |
| 5,534,574 A | 7/1996 | Sandstrom et al. ......... 524/262 |
| 5,817,852 A | 10/1998 | Ichinohe et al. ............ 556/427 |

FOREIGN PATENT DOCUMENTS

| | | |
|---|---|---|
| CA | 2104528 | 11/1994 |
| CA | 2129281 | 11/1995 |
| EP | 0845472 | 6/1998 |

OTHER PUBLICATIONS

Degussa AG Catalog Si 69 X50–S X50, date unknown.

*Primary Examiner*—Bernard Lipman

(57) ABSTRACT

The present invention provides a rubber composition and a pneumatic tire using the rubber composition. A rubber composition comprises silica in an amount of 10 to 85 parts by weight per 100 parts by weight of natural rubber and/or diene synthetic rubbers. A polysulfide silane coupling agent having a specific distribution of sulfur reacts with a trivalent phosphorus compound such that a content of high polysulfide in the polysulfide silane coupling agent is reduced. The rubber composition further comprises 1 to 20% by weight, based on an amount of the silica, of the polysulfide silane coupling agent having a specific distribution of sulfur such that a content of high polysulfide component is small. The pneumatic tire has an excellent low heat buildup property.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–24 is confirmed.

\* \* \* \* \*